United States Patent

Siegmund

(10) Patent No.: US 11,416,276 B2
(45) Date of Patent: Aug. 16, 2022

(54) AUTOMATED IMAGE CREATION AND PACKAGE MANAGEMENT FOR EXPLORATION AND PRODUCTION CLOUD-BASED APPLICATIONS

(71) Applicant: Schlumberger Technology Corporation, Sugar Land, TX (US)

(72) Inventor: Frederik Siegmund, Abingdon (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 198 days.

(21) Appl. No.: 16/646,587

(22) PCT Filed: Sep. 13, 2018

(86) PCT No.: PCT/US2018/050875
§ 371 (c)(1),
(2) Date: Mar. 12, 2020

(87) PCT Pub. No.: WO2019/055649
PCT Pub. Date: Mar. 21, 2019

(65) Prior Publication Data
US 2020/0285504 A1    Sep. 10, 2020

Related U.S. Application Data

(60) Provisional application No. 62/558,082, filed on Sep. 13, 2017.

(51) Int. Cl.
*G06F 9/455* (2018.01)
*G06F 8/61* (2018.01)
*G06F 9/54* (2006.01)

(52) U.S. Cl.
CPC .......... *G06F 9/45558* (2013.01); *G06F 8/63* (2013.01); *G06F 9/54* (2013.01); *G06F 2009/4557* (2013.01); *G06F 2009/45562* (2013.01)

(58) Field of Classification Search
None
See application file for complete search history.

(56) References Cited

U.S. PATENT DOCUMENTS 9,494,707 B2 * 11/2016 Kumar ............... G06K 9/00624
10,210,638 B2 * 2/2019 Zhu ........................... G06T 7/90
(Continued)

FOREIGN PATENT DOCUMENTS

| WO | 2016/112241 A1 | 7/2016 |
| WO | 2017/007967 A1 | 1/2017 |

OTHER PUBLICATIONS

International Preliminary Report on Patentability for the counterpart International patent application PCT/US2018/050875 dated Mar. 26, 2020.
(Continued)

*Primary Examiner* — Nan H Nguyen
(74) *Attorney, Agent, or Firm* — Michael Guthrie

(57) ABSTRACT

Methods, apparatus, systems, and computer-readable media are set forth for receiving an image definition from a client device, the image definition identifying one or more packages to be deployed within an image, each of the one or more packages including an exploration and production computer program, automatically building an image using the image definition, the image including the one or more packages, and deploying an operating environment including an instance of the image.

21 Claims, 8 Drawing Sheets

(56) References Cited

U.S. PATENT DOCUMENTS

| | | | |
|---|---|---|---|
| 10,318,265 B1 * | 6/2019 | To | H04L 67/34 |
| 10,755,006 B2 * | 8/2020 | Adam | E21B 43/00 |
| 2010/0050168 A1 | 2/2010 | Sharonov | |
| 2013/0346754 A1 | 12/2013 | Selman et al. | |
| 2014/0000964 A1 | 1/2014 | Selman et al. | |

OTHER PUBLICATIONS

International Search Report and Written Opinion for the counterpart International patent application PCT/US2018/050875 dated Jan. 11, 2019.

* cited by examiner

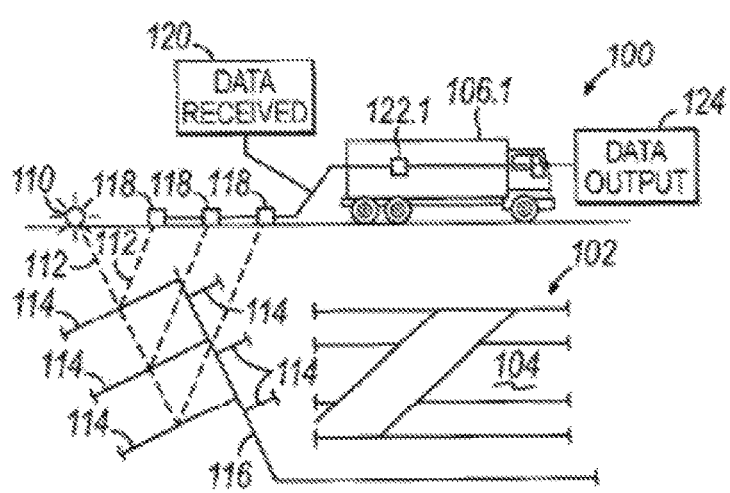
FIG. 1.1
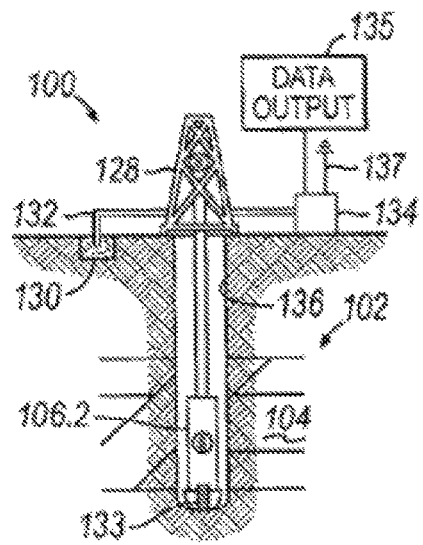
FIG. 1.2
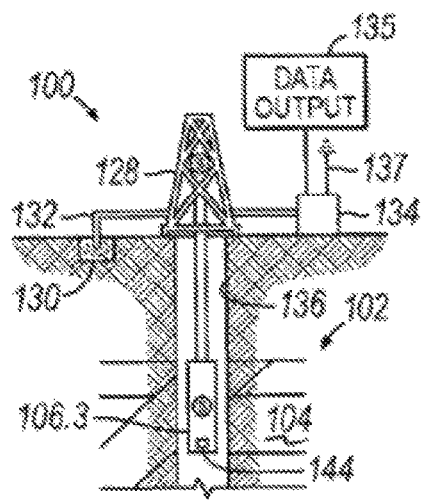
FIG. 1.3
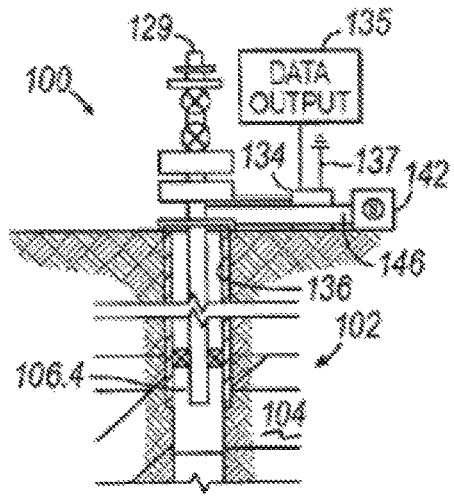
FIG. 1.4

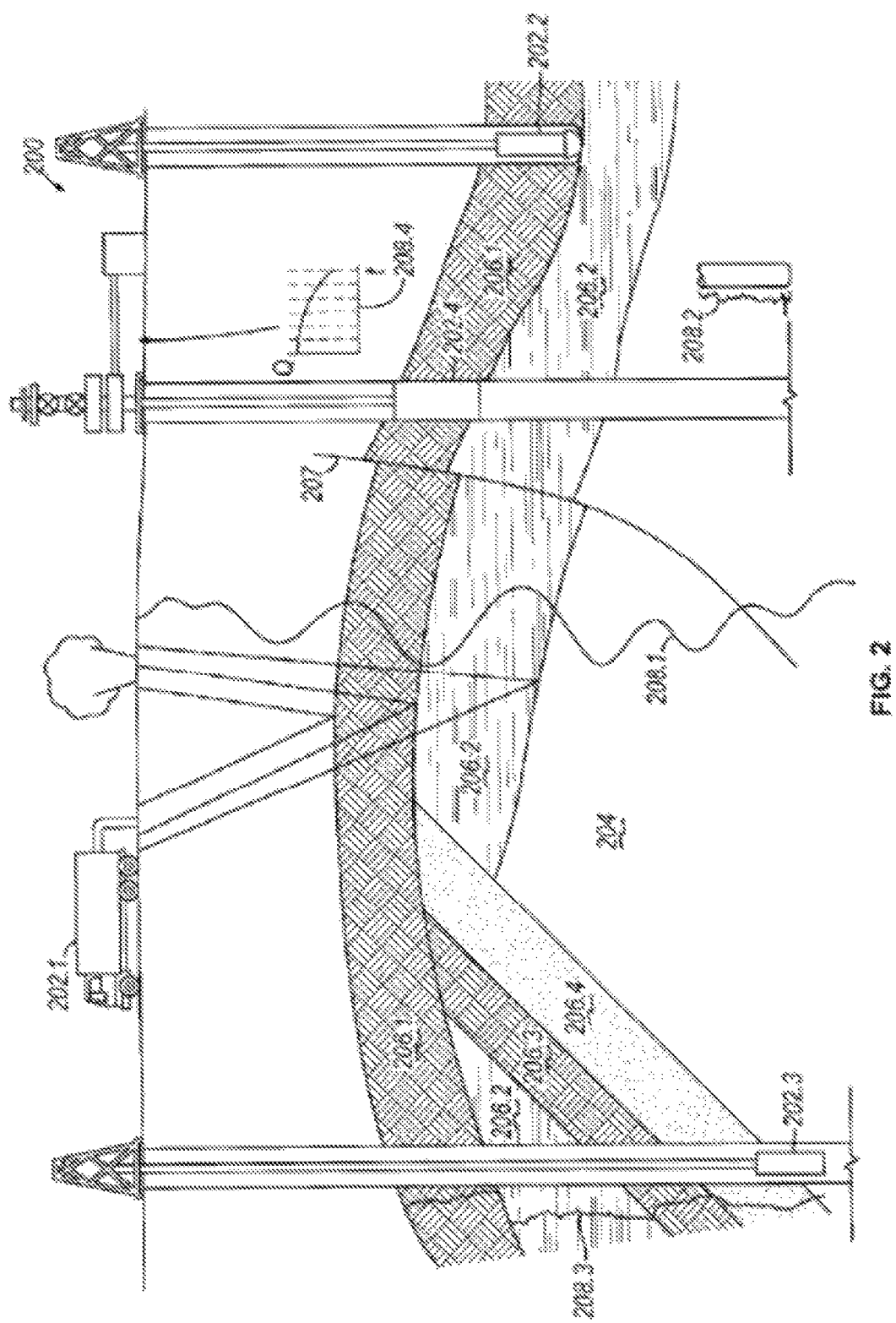

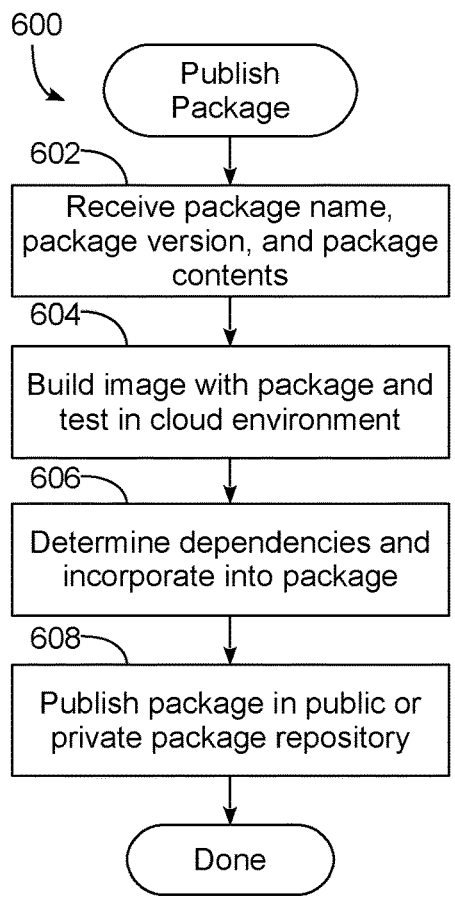
FIG. 6.1
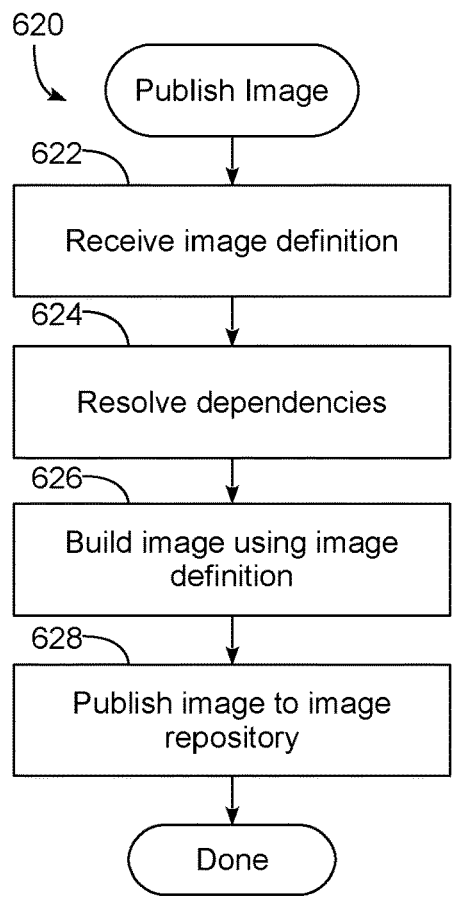
FIG. 6.2
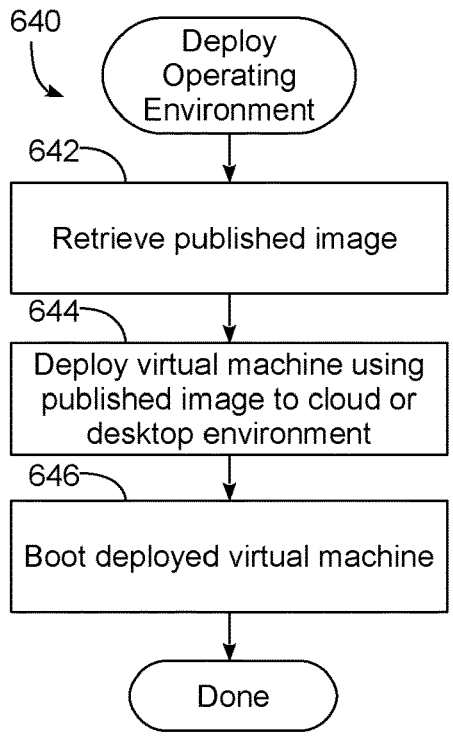
FIG. 6.3

AUTOMATED IMAGE CREATION AND PACKAGE MANAGEMENT FOR EXPLORATION AND PRODUCTION CLOUD-BASED APPLICATIONS

CROSS-REFERENCE TO RELATED APPLICATION(S)

This application claims priority to and the benefit of a U.S. provisional application having Ser. No. 62/558,082, filed 13 Sep. 2017, which is incorporated by reference herein.

BACKGROUND

In the oil and gas industry, data is often generated from a variety of sources for clients that seek to remain privy to the latest trends in exploration and production technology. When data is not consistent or inaccessible, decisions made by such clients may not be the most well-informed, potentially resulting in production inefficiencies. Furthermore, enterprises of all types and sizes are coping with a wider variety of data at a very large scale, making it more difficult than ever to realize production insights. At the same time with the growth in cloud based commodity computing, it is becoming increasingly difficult to package insights for delivery to customers and clients. Accessing appropriate applications and other programs for the purposes of accessing and otherwise consuming such data can also present difficulties given the wide variety of applications and programs available for such purposes, as well as the frequent need to utilize multiple such applications and programs for implementing exploration and production workflows.

SUMMARY

Methods, apparatus, systems, and computer-readable media are set forth for receiving an image definition from a client device, the image definition identifying one or more packages to be deployed within an image, each of the one or more packages including an exploration and production computer program, automatically building an image using the image definition, the image including the one or more packages, and deploying an operating environment including an instance of the image.

Some implementations also include deploying the operating environment includes deploying the operating environment as a virtual machine to a desktop or cloud computing environment and booting the virtual machine. In some implementations, the image definition includes a JSON template. In some implementations, automatically building the image further includes automatically resolving one or more dependencies associated with the one or more packages, while in some implementations, automatically building the image further includes publishing the image to an image repository.

Some implementations also include publishing a package among the one or more packages to a package repository, including receiving a package name, package version and package contents and publishing the package using the package name, package version and package contents. In some implementations, publishing the package further includes determining one or more dependencies and incorporating the one or more dependencies into the package, and in some implementations, publishing the package further includes building an image with the package and testing the image in a cloud computing environment. In some implementations, the package repository is a public or private package repository, and in some implementations, the package is a service provider application, a service provider plugin, a third party application, or a third party plugin. In some implementations, receiving the image definition is performed through an applications programming interface (API) as substantially described herein.

Some implementations also include a system including one or more processors and memory configured to store instructions that, when executed by one or more processors, cause the one or more processors to perform any of the aforementioned operations, as well as a non-transitory computer readable medium configured to store instructions that, when executed by one or more processors, cause the one or more processors to perform any of the aforementioned operations.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIGS. 1.1-1.4 illustrate simplified, schematic views of an oilfield having subterranean formation containing reservoir therein in accordance with implementations of various technologies and techniques described herein.

FIG. 2 illustrates a schematic view, partially in cross section of an oilfield having a plurality of data acquisition tools positioned at various locations along the oilfield for collecting data from the subterranean formations in accordance with one or more embodiments.

FIG. 6.1 illustrates a method for publishing a package in accordance with one or more embodiments.

FIG. 6.2 illustrates a method for publishing an image in accordance with one or more embodiments.

FIG. 6.3 illustrates a method for deploying an operating environment in accordance with one or more embodiments.

DETAILED DESCRIPTION OF THE INVENTION

Figure 3:
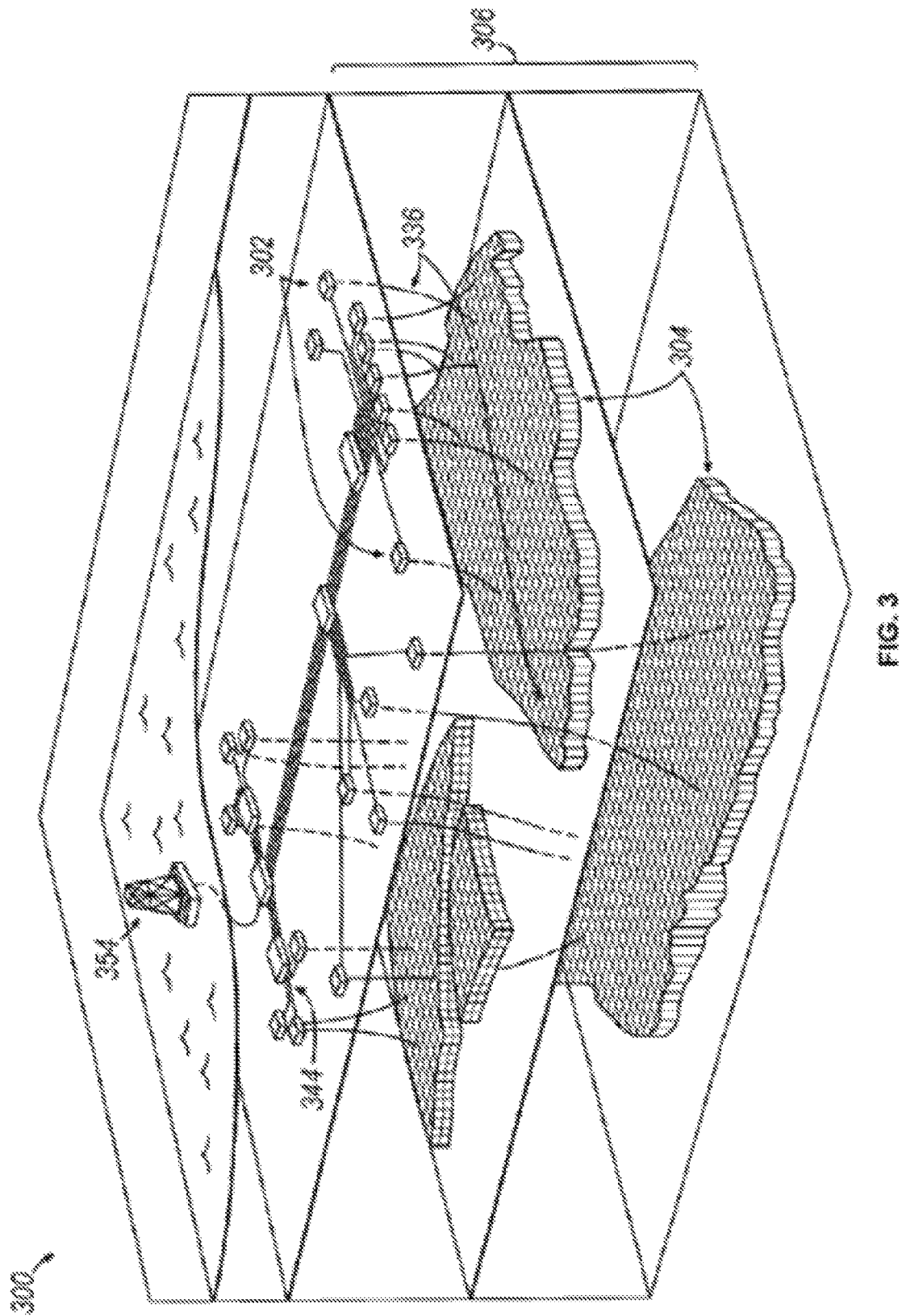
FIG. 3 illustrates a production system for performing one or more oilfield operations in accordance with one or more embodiments.

The computer programs used by personnel in exploration and production industries such as the oil & gas industry are often associated with a substantial overhead in terms of computer hardware and IT support. Traditionally, computer programs have been installed locally on a desktop or laptop computer assigned to a specific end user, or in some instances on a higher performance server computer, mainframe computer or supercomputer that is accessed remotely by client computers for multiple end users. Given the wide variety of scientific and technical disciplines involved in exploration and production, as well as the different job duties and different personnel and the specialized circumstances of different projects, however, one size generally does not fit all, and as a result, different end users, organizations and other entities may rely on different combinations of applications, plugins, and other computer programs to perform different tasks. The overhead for installing or deploying computer programs, updating computer programs, and otherwise maintaining computer programs for individual end users, organizations and other entities can therefore be substantial.

More recently, cloud computing environments have been developed to provide on-demand services that in many respects reduce the hardware requirements and/or maintenance overhead for individual end users. Rather than running computer programs locally, the computer programs may be executed in a cloud computing environment with user input and output communicated over a network between the cloud computing environment and a client computer. By doing so, expensive, high performance hardware can be shared by multiple end users, organizations and other entities, and installation, deployment, and other computer program maintenance activities can be centralized to some extent to reduce management overhead.

Many cloud computing environments rely on virtualization, whereby computer programs are executed within virtual machines that are either hosted on cloud hardware, on an organizations private network, or on end user client computers. A virtual machine generally includes an operating system instance and any applications, plugins or other computer programs needed for a particular installation, and the virtual machine is allocated a portion of the available computing resources (e.g., processors, memory and/or storage) on the platform upon which it is hosted. Virtual machines in many instances effectively emulate standalone computers, and in some instances, the computer programs executing within a virtual machine have no awareness that they are not running in virtual machines.

Despite the reduced management overhead associated with cloud computing environments and virtualized computing environments, it has been found that substantial human interaction is still required for deployment and management of computer programs in both on premise environments and in virtualized and/or cloud computing environments. In part, this is due to the diverse needs of different end users in exploration and production industries since a large number of unique deployments are generally needed.

Embodiments consistent with the invention, on the other hand, may employ an automated image creation and packaging management system to facilitate deployment and/or management of unique deployments to different entities within an exploration and production environment. In this regard, the term "exploration and production" generally refers to data, activities, operations, environments, etc. associated with the exploration and/or production of natural resources. Thus, for example, exploration and production data may include data that is associated solely with natural resource exploration activities, data associated solely with natural production activities, data associated with both natural resource exploration activities and natural resource production activities, and even data associated with support activities for any of the aforementioned natural resource activities. Put another way, the term "exploration and production" should not be considered to describe data, activities, operations, environments, etc. that is necessarily associated with both exploration and production.

As will become more apparent below, the herein-described embodiments can, in some instances, reduce or eliminate the need for applications and other computer programs to be installed or deployed for individual end users, organizations or entities and instead enable comparable functionality be delivered as a service on-demand. Such functionality may be automatically incorporated into an exploration and production cloud "image" that incorporates various combinations of applications, plugins, and other computer programs appropriate for a particular end user or organization, and generally without having to manually install and deploy them. Doing so can greatly reduce the time from an entity purchasing a cloud service to actually consuming a cloud service, and may also allow entities if desired to seamlessly integrate their own third party applications and/or plugins into service provider's cloud service.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the embodiments. However, it will be apparent to one of ordinary skill in the art that various embodiments may be practiced without these specific details. In other instances, well-known features have not been described in detail to avoid unnecessarily complicating the description.

FIGS. 1.1-1.4 illustrate simplified, schematic views of an oilfield 100 having subterranean formation 102 containing reservoir 104 therein in accordance with implementations of various technologies and techniques described herein. FIG. 1.1 illustrates a survey operation being performed by a survey tool, such as seismic truck 106.1, to measure properties of the subterranean formation. The survey operation is a seismic survey operation for producing sound vibrations. In FIG. 1.1, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1.2 illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is generally filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan generally sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 1.3 illustrates a wireline operation being performed by wireline tool 106.3 suspended by rig 128 and into wellbore 136 of FIG. 1.2. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein. In general, wireline tool 106.3 may thereby collect acoustic data and/or image data for a subsurface volume associated with a wellbore.

Wireline tool 106.3 may be operatively connected to, for example, geophones 118 and a computer 122.1 of a seismic truck 106.1 of FIG. 1.1. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1.4 illustrates a production operation being performed by production tool 106.4 deployed from a production unit or christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the well sites for selectively collecting downhole fluids from the wellsite(s).

While FIGS. 1.2-1.4 illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1.1-1.4 are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1.1-1.4, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

FIG. 3 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3 is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 4:
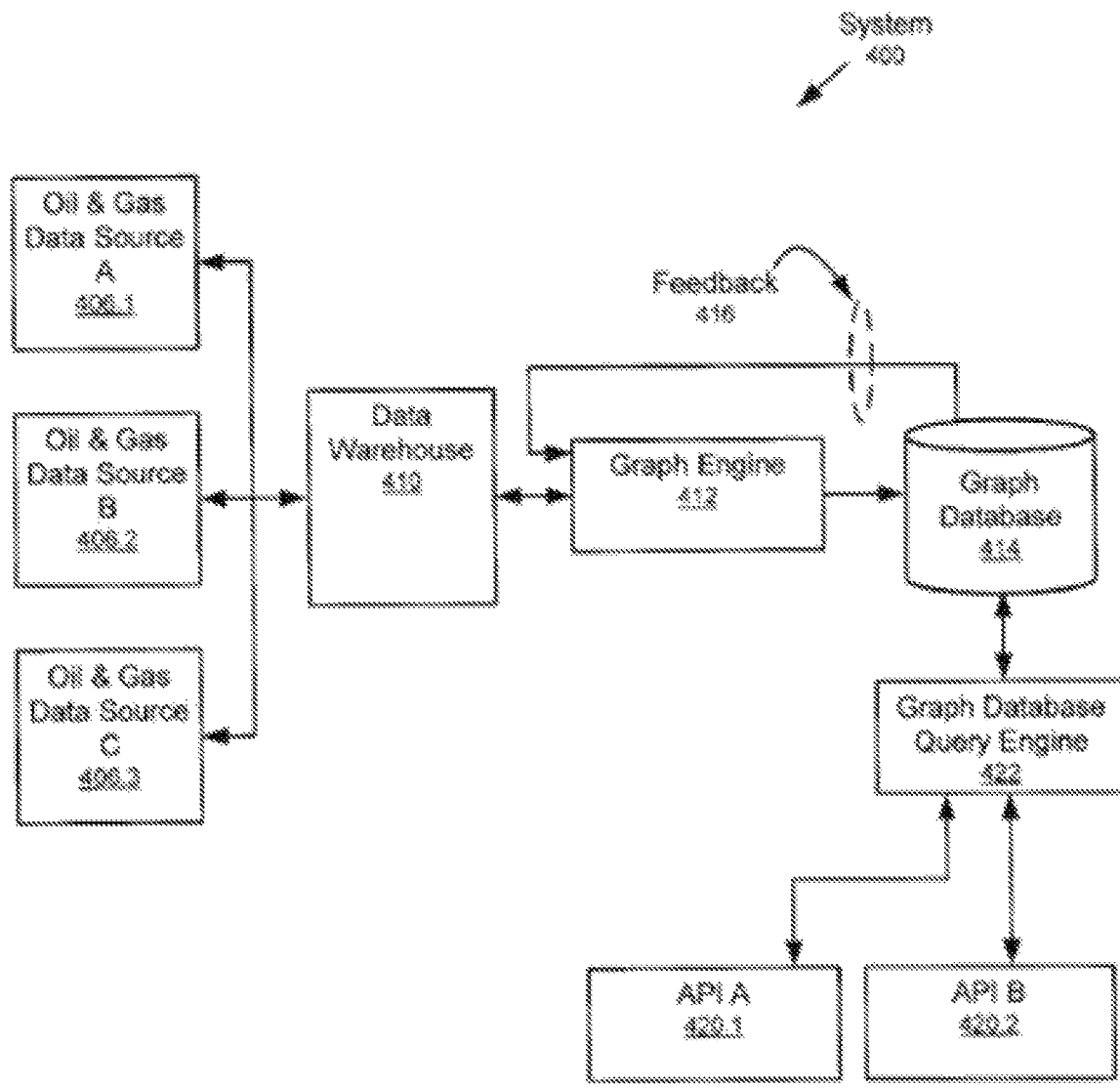
FIG. 4 illustrates a system in accordance with one or more embodiments.

FIG. 4 shows a system 400 in accordance with one or more embodiments and suitable for providing a data lake that may be accessible by a cloud service consistent with some embodiments of the invention. The system 400, or part of the system 400, may be located in a surface unit (e.g., surface unit (134)). As shown in FIG. 4, the system 400 has multiple components including multiple data sources (e.g., OG Data Source A 406.1, OG Data Source B 406.2, OG Data Source C 406.3, a data warehouse 410, a graph engine 412, a graph database 414, a graph database query engine 422, and one or more APIs (e.g., API A 420.1, 420.2). Each of the components (406.1, 406.2, 406.3, 410, 412, 414, 422, 420.1, 420.2) may be located on the same computing device (e.g., server, mainframe, personal computer, laptop, tablet PC, smart phone, kiosk, etc.) or on different computing devices connected by a network of any size or topology with wired and/or wireless segments.

As shown in FIG. 4, the system 400 has multiple OG data sources 406.1, 406.2, 406.3. These OG data sources 406.1, 406.2, 406.) may correspond to sensors or measurement tools on site in an oilfield. These OG data sources 406.1, 406.2, 406.3 may correspond to external databases or websites. The OG data sources 406.1, 406.2, 406.3) output data items. These data items may be of any type or size relevant to an oilfield. For example, these data items may include well fracturing depth-temperature-energy band data (real-time or playback from previously fractured wells), user annotations and comments, any open literature, etc.

In one or more embodiments, the system 400 includes data warehouse 410. The data warehouse 410 may correspond to one or more repositories. The data warehouse (410) ingests (e.g., obtains and stores) the data values from the OG data sources 406.1, 406.2, 406.3. The data warehouse 410 is effectively a consolidated source of data items regarding an oilfield.

In one or more embodiments, the system 400 includes the graph engine 412. The graph engine 412 applies one or more transformations (e.g., pipelines) to the data items to generate one or more transformed data items. Application of one or more transformations may be triggered by various conditions (e.g., changes in temperature, pressure, depth, composition in well, etc.). Application of one or more transformations may occur at set times or milestones. One or more transformations may be custom designs. One or more transformation include machine learning. Example transformations include: data cleansing (bound checks, NaN), conversion to different format, aggregates based on one or more state changes, statistical calculations (variance, mode, standard deviation).

In one or more embodiments, the system 414 includes the graph database 414. The graph database 414 implements a knowledge graph for an oilfield. In other words, the graph database 414 is an OG graph database. The graph database 414 includes one or more nodes connected by one or more edges. Each node may correspond to one or more entities in the oilfield. Each edge is a relationship between two or more nodes. In one or more embodiments, the graph engine 412 modifies (e.g., populates, enriches, shrinks, etc.) the graph database 414 based on the transformed data items. This may include modifying existing nodes and edges, removing existing nodes and edges, and/or inserting new nodes and new edges. The nodes or edges may include the transformed data items. For example, nodes may correspond to wells, client/customer ID, chemicals used in the oilfield. Edges may correspond to any links between these nodes & disconnected data silos.

As shown in FIG. 4, there exists a feedback loop 416 from the graph database 414 to the graph engine 412. One or more node or edges in the graph database 414 may be data values that are transformed by the graph engine 412.

In one or more embodiments, the system 400 includes the graph database query engine 422. The graph database query engine 422 receives user requests regarding an oilfield entity and generates a result to the request. The result may be generated by traversing the graph database 414. The result may be a summary or digest regarding the oilfield entity. For example, the user request may be: "Give me a summary of all wells fractured between December 01 and December 31 in year XXXX for client A."

In one or more embodiments, the system 400 includes multiple APIs 420.1, 420.2. It is through the APIs 420.1, 420.2 that users may issue request and obtain (e.g., view, print) results in response to the request. APIs provide data to monitoring front-end and may have a rich user interface to view data close to real-time in the form of heat maps, line plots, etc.

Figure 5:
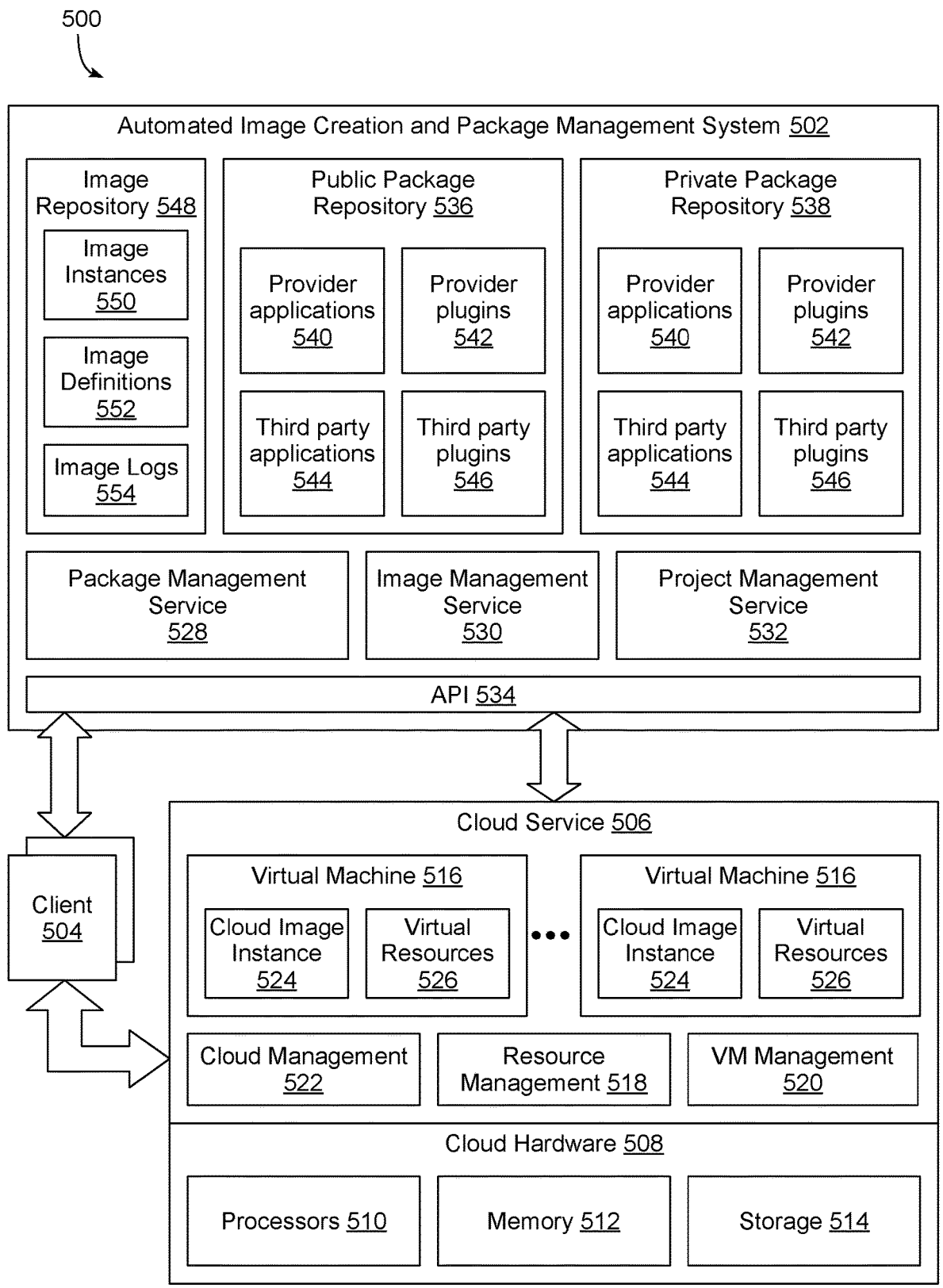
FIG. 5 illustrates a system including a cloud service and an automated image creation and packaging management system in accordance with one or more embodiments.

Now turning to FIGS. 5-6.3, in some embodiments of the invention, an automated image creation and packaging management system may be provided to facilitate deployment and/or management of applications, plugins and other computer programs utilized by end users, organizations and other entities within an exploration and production industry. The term "computer program" will hereinafter be used to describe various applications, plugins, tools and other software that may be used in an exploration and production industry, e.g., in the oil & gas industry, including applications, plugins, tools, and other software for use in connection with sub surface exploration, production, field development, well planning, forecasting, enhanced oil recovery, etc. Some implementations, for example, may utilize the data lake described above in connection with FIG. 4, although it will be appreciated that the invention is not so limited.

FIG. 5, for example, illustrates an example system 500 including an automated image creation and packaging management system 502 that is accessible by one or more clients 504 in connection with accessing a cloud service 506. System 500 may, in some instances, be a cloud computing environment. Each client 504 may be associated with an end user, a customer, an organization, or an entity, clients may also include clients associated with management of system 502 or cloud service 506 as opposed to consumers of the services provided by system 502 and cloud service 506. A client 504 may be implemented as a desktop computer, a server computer, a mobile computer, a wearable computer, or any other programmable electronic device capable of interacting with a cloud computing environment.

System 500 may be used in some implementations in connection with a software-as-a-service offering whereby rather than licensing individual computer programs to end users and other entities, computer programs or comparable functionality are provided on-demand and via a subscription. Doing so may enable greater flexibility and choice for end users and other entities, as well as greater control over financial commitments to service providers.

System 500 in particular may provide a group of services that automatically provision and deliver operating environments for various service provider computer programs through a cloud computing environment, in some instances negating the need for end users or other entities to deploy the operating environments on premises, i.e., on individual end user computers, on an organization's on premises servers, etc.

For the purposes of the discussion hereinafter, a number of terms are defined below:

An 'Image' is a template of applications, plugins and other computer programs (including, for example, desktop-based software, server software, mobile software, etc.) that can be instantiated multiple times into a running system, or 'instance'. Similar to cookie dough—for baking cookies, which can be replicated with each cut.

A 'Package' is the binaries required for successfully adding a software or service to an Image. Similar to a flavoring or ingredient used in baking cookies.

A 'Package Repository' is the location in which packages are stored, e.g., in a cloud computing environment or otherwise. In the cookie example, this would be a pantry used for baking goods.

A 'Provisioning System' is the tooling used to create the image, combine packages and deliver instances of the image. Similar to a cutting tool, oven and cookie trays used in baking cookies. Automated image creation and package management system 502 may be considered in some instances to implement a provisioning system.

An 'Image Definition' is the list of packages to be used in the image creation. In the cookie dough example, this is the recipe.

Cloud service 506 may be implemented in a number of different manners known in the industry. In one implementation, for example, cloud service 506 may include cloud hardware 508 including processing resources 510, memory resources 512 and/or storage resources 514, e.g., provided in one or more server farms, data centers, or the like, and shareable by large numbers of clients. Cloud service 506 in the illustrated implementation is a virtualized computing environment in which multiple virtual machines 516 are hosted in the environment. Resource management functionality 518 manages the allocation of cloud hardware within the environment, while virtual machine management functionality 520 manages the deployment, execution, and termination of virtual machines within the environment. Cloud management functionality 522 may also be used to manage other aspects of the cloud service, e.g., user log in and authentication, security, billing, etc.

Each virtual machine 516 hosts a cloud image instance 524, which as discussed in greater detail below, may include an operating system instance and a combination of computer programs to be executed within an operating environment defined by the virtual machine. In addition, each virtual machine 516 is generally allocated various virtual resources 526, e.g., processing, memory and storage resources, which are mapped to physical resources from cloud hardware 508 such that the physical resources mapped to the virtual resources of a virtual machine are used to execute the virtual machine.

Automated image creation and package management system 502 may allow service providers as well as end users, third parties, organizations and other entities to upload packages to one or more package repositories, as well as to create images suitable for instantiation in a virtual machine 516 and manage one or more projects with which various packages and/or images may be associated, using functionality implemented in a package management service 528, image management service 530 and project management service 532, which are collectively accessible by clients 504 through an applications programming interface (API) 534.

Package management service 528 may manage one or more packaging repositories, e.g., one or more public package repositories 536 and/or one or more private package repositories 538. A public package repository 536 may be available to all tenants in system 500, and may be searchable for example to enable publically-available packages to be located and used to create custom images. A private package repository 538 may be available only to a specific tenant, customer, end user, organization or other entity, or restricted group of such entities.

Various types of computer programs may be stored in each repository 536, 538, e.g., provider applications 540, provider plugins 542, third party applications 544, and/or third party plugins 546. A provider application or plugin is supported by a service provider for system 500, while a third party application or plugin is supported by an individual tenant or other consumer or user of system 500, or potentially another entity not having access to system 500. Applications may include stand-alone computer programs that run within an operating system instance, whereas plugins may include computer programs that "plug in" to applications to enhance or modify their operation. Any type of computer program, however, may be distributed as a package and stored in a repository, however, so the invention is not limited to applications and/or plugins. It will also be appreciated that certain computer programs may be restricted to certain repositories, e.g., to restrict public package repository 536 to only applications and/or plugins of the service provider or otherwise reviewed and approved by the service provider.

In some implementations, packages may be published along with supporting installation and/or automation scripts to make such packages available in a repository 536, 538. Package management service 528 may therefore include functionality to publish packages, as well as to delete, build, modify, search for, or restrict access to packages, among other functions.

Image management service 530 may be used to manage an image repository 548, within which may be stored image instances 550, image definitions 552 and image logs 554. An image instance 550 represents an instance of an image defined by an image definition 552, which may additionally include dependencies and other information suitable for generating an image from one or more packages identified by the image instance. An image log 554 may be generated during building of an image or image instance to enable the sequence of operations performed when an image or image instance is created to be debugged, analyzed for errors or otherwise reproduced. Image logs need not be generated in some implementations, and in some implementations, image instances and/or image definitions need not be maintained in any repository, such that image instances are generated on demand and returned to clients 504 in response to image definitions submitted by the clients.

Images may be generated from one or more packages along with additional supporting program code such as operating system instances, scripts, supporting data and the like. In a traditional desktop environment, an IT engineer and IT imaging team is generally required to manually build images for their desktops, often additionally requiring an engineer to install each individual package and run tests to validate successful installation. This image would then have to be snapshotted into an instance and deployed to on premise hardware of a customer.

In the illustrated embodiment, on the other hand, a client, e.g., an end user, organization or other entity, may build an image definition, e.g., from a pre-defined template (e.g., using a JavaScript Object Notation (JSON)-compatible format), specifying which packages and versions should be included. The image definition then may be submitted as a request to image management service 530 to build an image instance suitable for deployment either in a virtual machine 516 of cloud service 506, or in some instances, in a virtual machine on an end user's or other entities on premise hardware.

In some implementations, image management service 530 may resolve any dependencies associated with any applications and/or plugins, and in some instances, third parties may define their own dependencies in association with deploying any third party packages. Image management service 530 may also have additional functionality, e.g., to manage stored image instances, image definitions, an image logs, e.g., by searching for, retrieving, creating, modifying, restricting access to, or deleting any of these elements.

Project management service 532 may be used to define, create, modify, delete, access, search for, or restrict access to various projects established for various entities accessing system 500. Thus, for example, clients may be permitted to create certain projects, associate packages and/or images with those projects, and restrict access to those projects to only authorized entities. In other embodiments, however, projects may not be supported.

Other functionality may also be supported in automated image creation and packaging management system 502, e.g., billing, user log in and authentication, package or image testing or verification, etc., as will be apparent to those of ordinary skill having the benefit of the instant disclosure. Moreover, in some instances system 502 may be integrated into cloud service 506 or otherwise accessible by cloud service 506. In other implementations, however, system 502 may be completely separate from cloud service 506.

FIG. 6.1 next illustrates a method 600 for publishing a package to a package repository 536, 538 in system 502. In this embodiment, package repository design may be implemented using the following hierarchy, as illustrated in Table I below for an example package associated with the Petrel platform available from Schlumberger Ltd. and its affiliates:

TABLE I

Packages Repository (packages-pitc-shared-prod)
    Package Name (petrel)
        Package Version (2016.3)
            Package Contents (install.ps1, install_petrel_2016.3.msi)

By incorporating a version, an entity may be able to specify which version of a package to include as part of an image. Thus, in method 600, package management service 530 may receive a package name, package version, and package contents from a client 504 (block 602). Optionally, at this time, or at some point subsequent to deployment of the package into an image instance, block 604 may build an image with the package for testing in the cloud computing environment (e.g., within a virtual machine 516). Block 604 may be performed automatically and/or with manual assistance, and may be used to verify that the package will execute appropriately in the cloud computing environment. Such verification may, in some instances, be a prerequisite for publication in a repository, or may be a prerequisite only for public repositories. Verification may not be performed in other instances.

Block 606 next optionally determines dependencies for the package, i.e., any other packages or other programs that are required for execution of a package in an image. This operation may be performed automatically and/or manually, and may be based on dependencies identified by a client. In some implementations, no such dependency determination may be performed. Block 608 next publishes the package into a public and/or private package repository for later retrieval and use, and method 600 is complete.

FIG. 6.2 next illustrates a method 620 for publishing an image. Traditionally, image publication may incorporate a number of manual activities, sometimes involving multiple cloud and/or software engineers. Traditional image publication, for example, may require manual determinations of package versions to be tested, transfers of packages between repositories, copying of packages into base image instances, installation of packages into base image instances, determinations of dependencies, manual installation and configuration of dependent computer programs and/or service provider computer programs, manual installation and configuration of third party packages, booting, system preparation, shutdown and subsequent snapshotting of a base image instance and copying of same to an image repository, and then creation of an instance from the base image instance.

In contrast, with method 620, an image definition is received in block 622, e.g., in a JSON format and/or using a predefined template, and specifying one or more packages to be incorporated into an image, and optionally including any scripts for automating and/or installing the packages. Then, in block 624, dependencies may be automatically resolved and in block 626, an image may be built from the image definition in an automatic fashion. Building the image may also include adding an operating system instance to the image and/or installing the packages, including installing plugins into applications upon which they are dependent. In block 628, the image may then be published to the image repository, and method 620 is complete. It will be appreciated that due to the fact that packages may be published and tested prior to image creation, dependency resolution and building of the image may be substantially automated in some instances, thereby avoiding the manual involvement typically seen with traditional image publication. With method 620, in many instances a client may simply define what packages are desired within an image, and the image may be created and published automatically, and ready for deployment in an operating environment.

FIG. 6.3 next illustrates a method 640 for deploying an operating environment, e.g., a virtual machine. Such deployment may be in cloud service 506 in some implementations, while in other implementations the deployment may be within an end user computer, an on premise computer, or another computer, e.g., in a virtualized computing environment. In block 642, in response to a request, or alternatively, at the completion of a request to publish an image, the published image is retrieved, and in block 644, a virtual machine is deployed using the virtual image, e.g., into a cloud or desktop environment. Then, in block 646, the deployed virtual machine is started or booted, whereby deployment of the operating environment is complete.

As noted above, to interface with system 502, an API 534 may be supported. In some implementations, the API may be implemented as a RESTful API with support for both engineers and applications to communicate and publish to system 502.

An example API may include at least the following operations:

GET/projects/{project}/vmimages—allows an engineer or developer to retrieve a list of images associated with a project, including custom images.

POST/projects/{project}/vmimages—allows an engineer or developer to post a JSON template of an image definition. This then instantiates the automated image creation process described above.

GET/projects/{project}/vmimages/{vmimage}—allows an engineer or developer to retrieve an image definition of a given image.

DELETE/projects/{project}/vmimages/{vmimage}—allows an engineer or developer to delete an image from a repository.

GET/projects/{project}/vmimages/{vmimage}/log—allows an engineer or developer to retrieve a log of the image creation process. Should something go wrong this will give information on what and when occurred during the process.

POST/projects/{project}/vmimages/{vmimage}/copyTo—allows an engineer or developer to copy an image to another project allowing them to use this image in different deployments.

Figure 7:
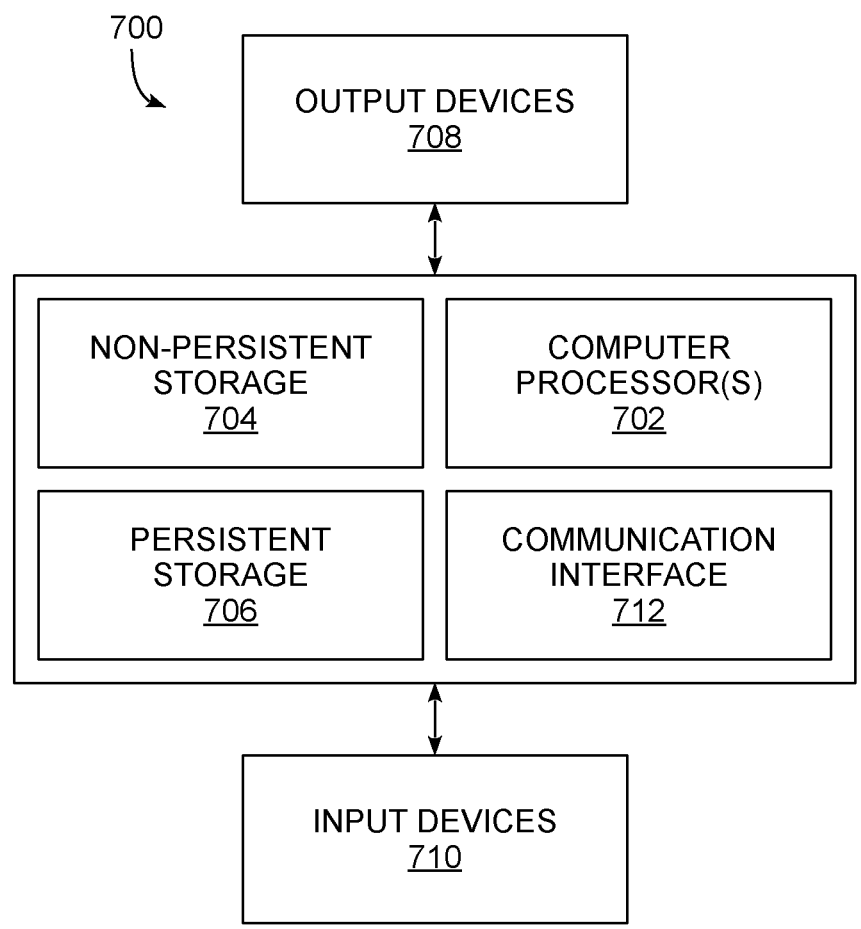
FIG. 7 illustrates an example computing system that can implement the various functions and features described herein.

The above API may be used by internal applications and engineers of a service provider and can in some instances be exposed publicly for customers, integrators and other entities to build and customize their images in cloud computing environment. The API is not exclusive and thus the invention is not limited to the particular API Embodiments may be implemented on a computing system. Any combination of mobile, desktop, server, router, switch, embedded device, or other types of hardware may be used. For example, as shown in FIG. 7, the computing system 700 may include one or more computer processors 702, non-persistent storage 704 (e.g., volatile memory, such as random access memory (RAM), cache memory), persistent storage 706 (e.g., a hard disk, an optical drive such as a compact disk (CD) drive or digital versatile disk (DVD) drive, a flash memory, etc.), a communication interface 712 (e.g., Bluetooth interface, infrared interface, network interface, optical interface, etc.), and numerous other elements and functionalities.

The computer processor(s) 702 may be an integrated circuit for processing instructions. For example, the computer processor(s) may be one or more cores or micro-cores of a processor. The computing system 700 may also include one or more input devices 710, such as a touchscreen, keyboard, mouse, microphone, touchpad, electronic pen, or any other type of input device.

The communication interface 712 may include an integrated circuit for connecting the computing system 700 to a network (not shown) (e.g., a local area network (LAN), a wide area network (WAN) such as the Internet, mobile network, or any other type of network) and/or to another device, such as another computing device.

Further, the computing system 700 may include one or more output devices 708, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 702, non-persistent storage 704, and persistent storage 706. Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

Figure 8:
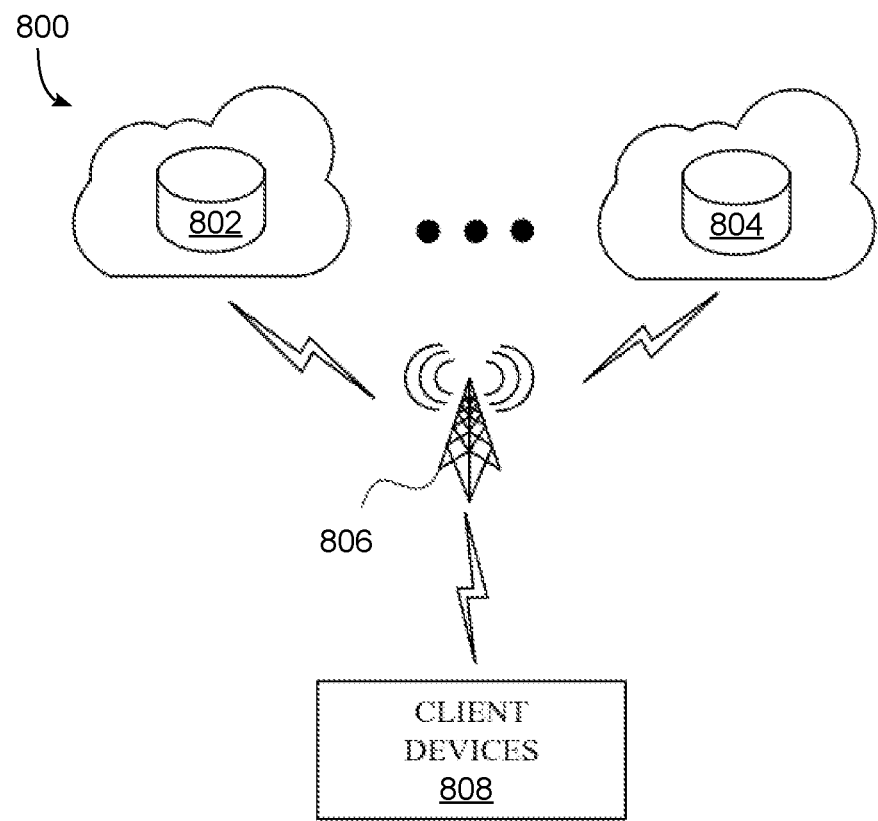
FIG. 8 illustrates an example network that can implement the various functions and features described herein.

The computing system 700 in FIG. 7 may be connected to or be a part of a network, such as the network 806 described by system 800 of FIG. 8. For example, as shown in FIG. 8, the network 806 may include multiple nodes (e.g., node X 802, node Y 804). Each node may correspond to a computing system, such as the computing system shown in FIG. 7, or a group of nodes combined may correspond to the computing system shown in FIG. 7. By way of an example, embodiments may be implemented on a node of a distributed system that is connected to other nodes. By way of another example, embodiments may be implemented on a distributed computing system having multiple nodes, where each portion of the embodiment may be located on a different node within the distributed computing system. Further, one or more elements of the aforementioned computing system 700 may be located at a remote location and connected to the other elements over a network.

Although not shown in FIG. 8, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X 802, node Y 804) in the network 806 may be configured to provide services for a client device 808. For example, the nodes may be part of a cloud computing system. The nodes may include functionality to receive requests from the client device 808 and transmit responses to the client device 808. The client device 808 may be a computing system, such as the computing system shown in FIG. 7. Further, the client device 808 may include and/or perform all or a portion of one or more embodiments.

The computing system or group of computing systems described in FIGS. 7 and 8 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

The above description of functions present only a few examples of functions performed by the computing system of FIG. 7 and the nodes and/or client device in FIG. 8. Other functions may be performed using one or more embodiments.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

I claim:

1. A method implemented by one or more processors, the method comprising:
receiving an image definition from a client device, the image definition identifying one or more packages to be deployed within an image, each of the one or more packages including an exploration and production computer program, and the image including an operating system instance for a virtual machine;
automatically building an image using the image definition, the image including the one or more packages; and
deploying an operating environment including an instance of the image, wherein deploying further comprises:
deploying the operating environment as a virtual machine to a computing environment,
booting the virtual machine, and
executing the operating system instance and the exploration and production computer program in the virtual machine,
wherein automatically building the image further includes automatically resolving one or more dependencies associated with the one or more packages.

2. The method of claim 1, further comprising deploying the operating environment includes deploying the operating environment and the virtual machine to a desktop or cloud computing environment.

3. The method of claim 1, wherein the image definition includes a JSON (JavaScript® Object Notation) template.

4. The method of claim 1, wherein automatically building the image further includes publishing the image to an image repository.

5. The method of claim 1, further comprising publishing a package among the one or more packages to a package repository, including:
receiving a package name, package version and package contents; and
publishing the package using the package name, package version and package contents.

6. The method of claim 5, wherein publishing the package further includes determining one or more dependencies and incorporating the one or more dependencies into the package.

7. The method of claim 5, wherein publishing the package further includes building an image with the package and testing the image in a cloud computing environment.

8. The method of claim 5, wherein the package repository is a public or private package repository.

9. The method of claim 5, wherein the package is a service provider application, a service provider plugin, a third party application, or a third party plugin.

10. The method of claim 1, wherein receiving the image definition is performed through an applications programming interface (API).

11. A system, comprising:
one or more processors; and
memory configured to store instructions that, when executed by one or more processors, cause the one or more processors to perform operations that include:
receiving an image definition from a client device, the image definition identifying one or more packages to be deployed within an image, each of the one or more packages including an exploration and production computer program, and the image including an operating system instance for a virtual machine;
automatically building an image using the image definition, the image including the one or more packages; and
deploying an operating environment including an instance of the image, wherein deploying further comprises:
deploying the operating environment as a virtual machine to a computing environment,
booting the virtual machine, and
executing the operating system instance and the exploration and production computer program in the virtual machine,
wherein automatically building the image further includes automatically resolving one or more dependencies associated with the one or more packages.

12. The system of claim 11, wherein the operations further include deploying the operating environment includes deploying the operating environment and the virtual machine to a desktop or cloud computing environment.

13. The system of claim 11, wherein the image definition includes a JSON (JavaScript® Object Notation) template.

14. The system of claim 11, wherein automatically building the image further includes publishing the image to an image repository.

15. The system of claim 11, wherein the operations further include publishing a package among the one or more packages to a package repository, including:
receiving a package name, package version and package contents; and
publishing the package using the package name, package version and package contents.

16. The system of claim 15, wherein publishing the package further includes determining one or more dependencies and incorporating the one or more dependencies into the package.

17. The system of claim 15, wherein publishing the package further includes building an image with the package and testing the image in a cloud computing environment.

18. The system of claim 15, wherein the package repository is a public or private package repository.

19. The system of claim 15, wherein the package is a service provider application, a service provider plugin, a third party application, or a third party plugin.

20. The system of claim 11, wherein receiving the image definition is performed through an applications programming interface (API).

21. A non-transitory computer readable medium configured to store instructions that, when executed by one or more processors, cause the one or more processors to perform operations that include:
receiving an image definition from a client device, the image definition identifying one or more packages to be deployed within an image, each of the one or more packages including an exploration and production computer program, and the image including an operating system instance for a virtual machine;
automatically building an image using the image definition, the image including the one or more packages; and
deploying an operating environment including an instance of the image, wherein deploying further comprises:
deploying the operating environment as a virtual machine to a computing environment,
booting the virtual machine, and executing the operating system instance and the exploration and production computer program in the virtual machine,
wherein automatically building the image further includes automatically resolving one or more dependencies associated with the one or more packages.

* * * * *